March 22, 1966 C. R. NAVIKAS 3,241,702
INSULATION CONSTRUCTION FOR CRYOGENIC CONTAINERS
Original Filed April 13, 1959 2 Sheets-Sheet 1
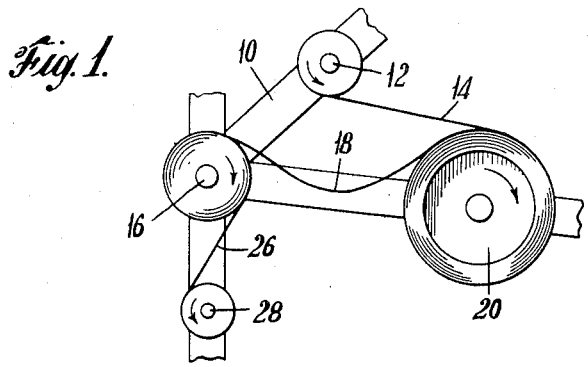
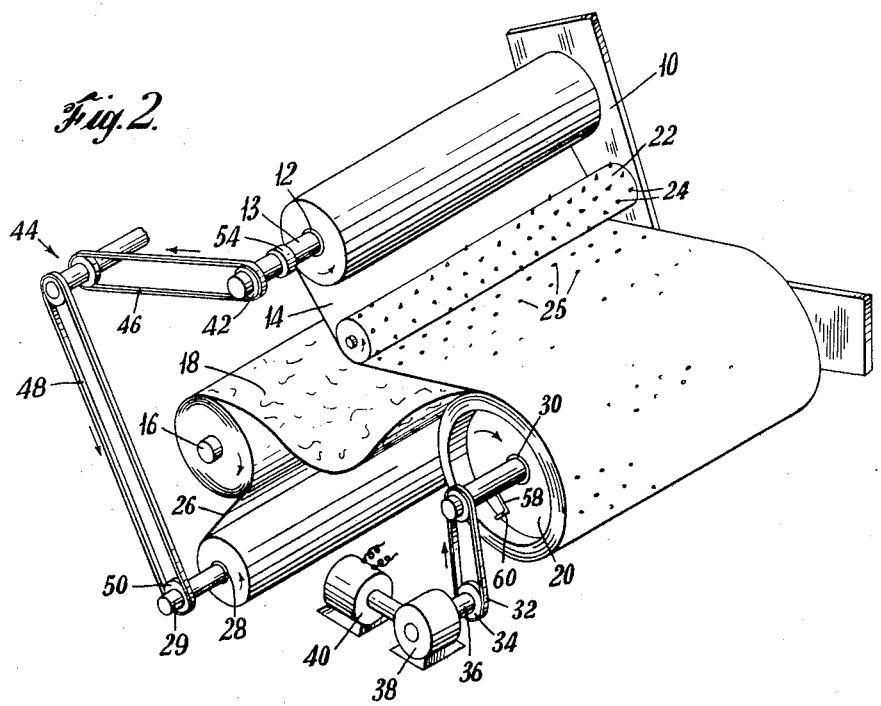
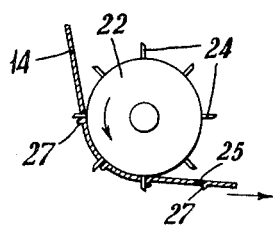
INVENTOR.
CHARLES R. NAVIKAS
BY William F. Mesinger
ATTORNEY March 22, 1966     C. R. NAVIKAS     3,241,702
INSULATION CONSTRUCTION FOR CRYOGENIC CONTAINERS
Original Filed April 13, 1959     2 Sheets-Sheet 2

INVENTOR.
CHARLES R. NAVIKAS
BY John C. ZeDever
ATTORNEY

United States Patent Office 3,241,702
Patented Mar. 22, 1966

3,241,702
INSULATION CONSTRUCTION FOR CRYOGENIC
CONTAINERS
Charles R. Navikas, Indianapolis, Ind., assignor to Union
Carbide Corporation, a corporation of New York
Original application Apr. 13, 1959, Ser. No. 805,793, now
Patent No. 3,019,573, dated Feb. 6, 1962. Divided
and this application Nov. 2, 1961, Ser. No. 149,709
1 Claim. (Cl. 220—9)

This invention relates to an insulation construction in combination with a cryogenic container, said assembly being made by a method and apparatus for applying a composite insulating material about a container, particularly the multi-layer insulating material employed in the solid-in-vacuum type insulation described in the copending application of L. C. Matsch, Serial No. 597,947, filed July 16, 1956, now U.S. Patent No. 3,007,596.

The aforesaid patent application discloses a multi-layer insulating material comprising generally alternating layers of a thin, flexible metal foil, such as aluminum, and a porous fibrous sheeting of low conductive material, such as glass fiber, which are conformably wraped around a cylinder under suitable tension.

It is possible to hand wrap the sheetings of foil and fibrous material around a container and end up with an insulation wrapping which will perform satisfactorily in the vacuum insulating space of a double walled container. However, such a procedure is not only time consuming and cumbersome, and in some instances not susceptible of practice because of the relative magnitudes of the container sizes and weights involved, but is relatively expensive.

The tension applied to the wrapped composite insulation is an essential variable which may tend to downgrade the insulating system. For example, as explained in the aforesaid patent application, tightening of the insulation wrapping causes the fibrous sheeting to be compressed and increases the effective path of solid conduction therethrough. On the other hand, wrapping the insulation too loosely decreases the number of foil turns and increases heat leak by radiation therethrough. Optimum results obtain somewhere between these extremes.

Furthermore, aluminum foil must be handled with great care as it may tear because of uneven or undue tension or other reasons. Applying the same tension to the foil and to the fiber sheeting is furthermore undesirable, because the fiber sheeting is considerably weaker in tension than the foil. It is also a problem to apply a suitable number of turns of composite insulation to provide an insulation wrapping of a prescribed thickness. In addition, there is a problem in handling or disposing of the paper backing, such as found in glass fiber rolls, during the process of wrapping the fiber sheet and aluminum foil around a container.

For these and other reasons, it is desirable to provide a reliable means for achieving a satisfactory wrapping of composite insulation about a container without encountering the aforementioned difficulties.

It is, therefore, an important object of the present invention to provide an improved method and apparatus for wrapping a container with composite layers of insulating material that results in a suitable and substantially uniform tension throughout the insulation wrapping.

It is another object of the invention to provide a convenient and economical method and apparatus for applying a wrapping of composite layers of insulation onto a container in a manner that is effective and not damaging to the composite layers of insulation.

Other objects, features and advantages of the invention will be apparent from the following detailed description of a preferred embodiment thereof, taken in conjunction with the attached drawings in which:

FIG. 1 is a schematic diagram showing an insulation wrapping machine embodying the principles of the invention;

FIG. 2 is an isometric view of a preferred modification of a wrapping machine showing the driving mechanism therefor;

FIG. 3 is an enlarged fragment of the view shown in FIG. 2 and illustrating the operation of the foil piercing roll.

Figure 4:
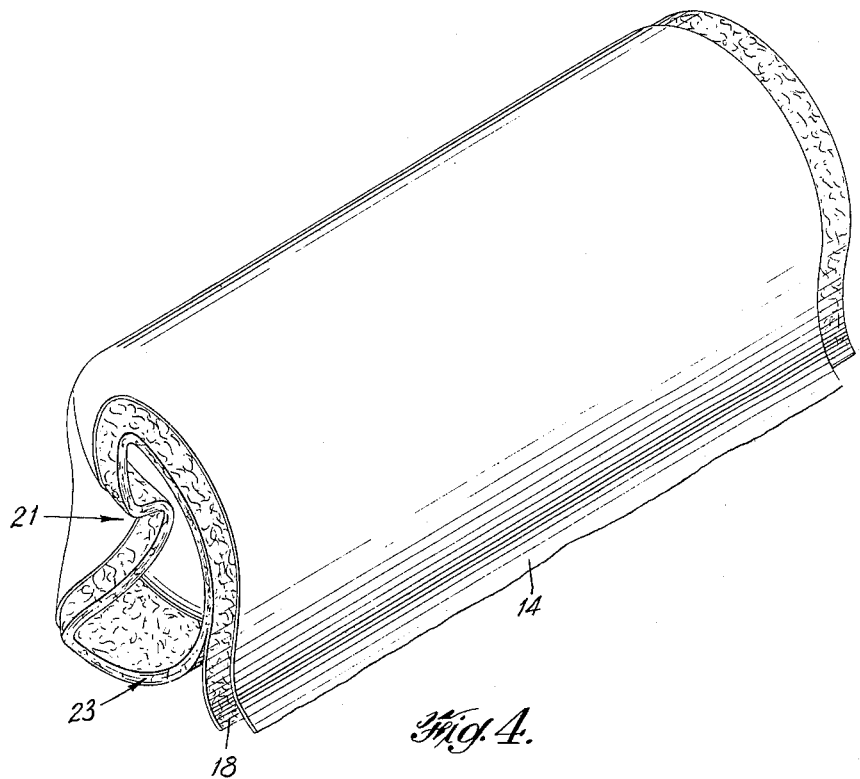
FIG. 4 is an isometric view of an article being wrapped according to the invention.

The preferred practice of the invention will be described in terms of wrapping a container with a composite insulation of aluminum foil and glass fiber sheeting. It is to be understood, however, that such description is presented as illustrative only and that it is not intended to limit the scope of the invention.

Shown in FIG. 1 is a preferred diagrammatic illustration of an insulation wrapping machine embodying the principles of the present invention comprising a pair of frame members 10, only one being shown, upon which are mounted a metal foil carrier roll 12 from which aluminum foil 14 is supplied, a fiber insulation stock roll 16 from which glass fiber sheeting 18 is fed, and a wind-up drum or container 20, which is the vessel to be insulated, about which a composite of the aluminum foil 14 and the glass fiber sheeting 18 is wound. The roll of aluminum foil 14 is mounted on the carrier roll 12 so that it will unroll and pass around the container 20, where it is superimposed upon glass fiber sheet 18 and wrapped therewith around the container.

The glass fiber sheet material 18 is commercially available and usually sold in rolled sheet form with a paper backing 26. Since the paper backing is not used in the formation of the insulation product, it is separated and collected on paper roll 28 as the fiber insulation roll 16 is unwound. Glass fiber sheet 18 is advanced from roll 16 and is fed onto the container 20 where it meets foil 14 and is plied between the layers of foil wrapping.

In the preferred modification of the invention shown in FIG. 2, means are provided for piercing the metal foil in order to form passages through the otherwise vapor-impervious barrier. This aids in complete evacuation of the insulation when it is installed in a container shell in the manner illustrated in the aforesaid application. To this end, a perforating roll 22 is rotatably mounted in the frame members 10 between the foil carrying roll 12 and the container 20. The aluminum foil 14 on roll 12 passes around the perforating roll 22 and is then conveyed to the container 20. The surface of the perforating roller 22 is provided with a plurality of generally radially extending projections 24 preferably arranged in helical rows of spirals. This arrangement permits piercing at any given instant a minimum number of uniformly spaced holes across the width of the metal foil 14 without significantly affecting the tensile strength of the foil. In addition, the helical arrangement affords means for providing a suitable number of perforations in the foil 14 without noticeably reducing the shielding properties thereof.

The enlarged view of the piercing roll shown in FIG. 3 illustrates the preferred configuration for the projections 24. Projections 24 should be bevelled with the leading bevel edge first contacting the foil. This pierces a hole 25 in the foil 14, and folds over the struck out portion or flap 27, thereby preventing it from flapping back and closing the hole.

Means are provided for driving the container 20 and the feed rolls 12, 16 and paper roll 28. For this purpose, the container 20 is rotatably mounted between headstock and tailstock supports 30, 30 extending from the frame members 10. Supports 30, 30 may for example be suitably spring loaded by means not illustrated but well-known to those skilled in the art, for ease in positioning the container therebetween. Headstock 30 is rotatably driven by a chain belt 32 from a pulley 34. Pulley 34 is mounted on a shaft 36 journalled in a bracket (not shown) on the machine frame. It is driven from a speed reducing gear box 38 connected to a motor 40.

The metal foil carrier roll 12 is connected to the paper collecting roll 28 through a pulley drive comprising a driver pulley 42 mounted on the axis 13 of roll 12, an intermediate speed regulating mechanism 44 suitably rotatably mounted in the frame 10, and a pulley belt 46 over said pulleys 42 and speed regulating mechanism 44. By means of a belt 48, the speed regulating mechanism 44 drives a driven pulley 50 mounted on the axis 29 of paper roll 28. As container 20 rotates, it pulls metal foil 14 from roll 12 and causes rotation of roll 12. Rotation of roll 12, in turn, causes paper roll 28 to rotate and pull paper backing 26 from the fibrous material 18. This causes glass fiber roll 16 to rotate and feed fibrous sheeting 18 toward container 20.

The speed regulating mechanism 44 between driver pulley 42 and driven pulley 50 provides the means for adjustably controlling the relative surface speeds of paper roll 28 and foil roll 12, such means being well-known by those skilled in the art. Preferably, the surface speed of paper sheeting 26 is adjusted to be slightly greater than the surface speed of foil 14. This removes substantially all the tension from the fibrous material 18 which is inherently a weak material and could easily separate under tension. Consequently, the fibrous sheeting 18 is literally laid on the container 20 without substantial tension. The composite of aluminum foil and fibrous layer insulation is wound up into a roll under moderate tension about the container 20. Tension of the metal foil is controlled by means of a Prony brake or other adjustable friction brake 54 located on the axis 13 of the roll 12.

The method and apparatus of the invention can be performed and operated by either one or two men, or can be fully automated if so desired. A favorable test of the invention was conducted under the following conditions:

A roll of .0004" thickness aluminum foil and 54" in width, mounted on roll 12, was manually unrolled to provide a sufficient length of aluminum foil sheeting 14 to pass around the perforating roll 22 and extend up to the container 20. The end of the aluminum foil 14 was taped to the cylindrical surface of the container 20, the outside diameter of which was approximately 15½". Rotation of the container 20 was gradually started by a first operator by means of a suitable control on motor 40. After approximately one-half turn of foil had been wrapped around the container, a second operator fed the free end of the fiber sheet 18, 57" in width and ¼" thick, from fiber roll 16 into the nip between the overlying foil 14 and container 20 as shown in FIG. 2. The backing paper 26 was taped to the backing paper roll 28.

The second operator firmly grasped roll 16 to halt its rotation, and relaxed his hold when necessary to control the feed of the fiber sheeting 18 during the starting period as it was introduced between the layers of aluminum foil. This control is possible due to the fact that the fiber roll 16 is mounted between two cone type rolls. Once the fiber sheeting had been gripped by foil wrapping, the second operator manipulated the friction brake 54 to achieve the proper tension or foil 14 and adjusted the speed of the fiber sheet 18 by means of the speed regulating mechanism 44.

It will be appreciated that care must be exercised in the feeding of the fiber sheeting 18 that no tension is applied thereto. For this purpose, and in order that the operator may have some leeway in adjusting the speed regulating mechanism 44 or the friction brake 54, a liberal amount of slack or sag must be provided in the fiber sheeting 18 as illustrated in the drawings. This slack is an excellent indication to the operator that the fiber sheeting is not under tension and amply warns him when an adjustment is necessary.

After the initial feeding of fiber and foil, the first operator controlled the speed of rotation of the container 20 and observed the foil 14 for rips or tears, and the second operator carefully watched the slack in the fiber sheeting 18 and properly adjusted the speed regulating mechanism 44 to compensate for changes in the sag of the fiber sheeting. During this period, there was no tension on the fiber sheeting 18, tension being solely on the foil 14 and the backing paper 26. The number of turns of composite insulation was suitably recorded, for example, by a rod 58 extending radially from the supporting shaft of headstock 30 and terminating in an offset arm 60 which slides over a recording tab or detent (not shown) fixed to the frame 10.

After 25 layers of composite insulation had been applied to the wrapping machine, the machine was stopped, and the circumference of the insulation was measured. The outside diameter of the insulation was then calculated to be 19". This dimension afforded sufficient clearance for the insulation wrapped container to be inserted into an outer container whose inside diameter was approximately 19½".

One extra turn of aluminum foil was applied to the container by firmly holding roll 16 and rotating container 20, thereby placing fiber sheeting 18 under tension and causing it to tear in a transverse direction. To prevent the loosening and unrolling of the insulation wrapping, the end of the aluminum foil was taped in place. Following this, the marginal portions of the composite insulation were folded in at both ends of the container 20 and taped in place. In so doing, a small portion of the insulation 21 was first pressed down and folded inwardly relative to the substantially cylindrical medial portion thereof which surrounds the container 20. The remaining unfolded marginal end portions 23 were then similarly folded inwardly in small portions until at least one of the end portions was convex in shape. This was carefully done to preserve the alternate layers of foil and fibrous sheeting and to avoid the possibility of the foil contacting the container. In this respect, the wider fibrous sheeting (57" in width) also preserved the spacing of the foil (54" in width). The wrapped container 20 was then removed from the wrapping machine and placed in a production line for assembly inside an outer container (not shown) to subsequently provide the insulation substantially shown and described in the aforesaid copending application.

It will be understood that although the insulation wrapping machine and insulation wrapping method of the invention have been described with reference to wrapping a cylindrically shaped container, the invention is not intended to be so limited. Modifications and variations may be effected without departing from the spirit and scope of the invention.

This is a divisional application of copending application Serial No. 805,793, filed Apr. 13, 1959 in the name of C. R. Navikas, now U.S. Patent No. 3,019,573.

What is claimed is:

An insulation construction in combination with a cylindrical vacuum insulated cryogenic container comprising a cylindrical vessel having multiple layers of composite insulating material wrapped around the medial portion thereof, said composite insulating material consisting of alternating layers of thin flexible metal foil and porous fibrous sheeting of low conductive material, said multiple layers of composite insulating material extending beyond at least one end of said vessel, the length of said layers of fibrous material extending further beyond said end than the layers of said metal foil, the portions of said composite insulating material extending beyond said end being folded inwardly relative to said medial portion in overlapping increments, whereby metal foil to foil contact between adjacent foil layers is avoided.

References Cited by the Examiner

UNITED STATES PATENTS

| | | | |
|---|---|---|---|
| 1,317,957 | 10/1919 | Carroll | 161—145 X |
| 2,726,977 | 12/1955 | See et al. | 154—44 |
| 2,830,000 | 4/1958 | Labino | 161—196 |
| 2,863,179 | 12/1958 | Gaugler | 220—9 X |
| 2,970,736 | 2/1961 | Baughan | 229—3.5 |
| 3,006,403 | 10/1961 | Cooper et al. | 154—44 |
| 3,007,596 | 11/1961 | Matsch | 154—44 |

JACOB H. STEINBERG, *Primary Examiner.*

HAROLD ANSHER, EARL M. BERGERT, *Examiners.*